United States Patent
Grenner

(10) Patent No.: US 6,945,334 B2
(45) Date of Patent: Sep. 20, 2005

(54) HONEYSUCKLE BUSH REMOVER

(76) Inventor: Christopher Grenner, 283 Gates Rd., Hamilton, OH (US) 45013

( * ) Notice: Subject to any disclaimer, the term of this patent is extended or adjusted under 35 U.S.C. 154(b) by 0 days.

(21) Appl. No.: 10/412,942

(22) Filed: Apr. 15, 2003

(65) Prior Publication Data

US 2004/0206515 A1 Oct. 21, 2004

(51) Int. Cl.⁷ ............................................... A01B 33/00
(52) U.S. Cl. ....................................... 172/378; 254/132
(58) Field of Search ............................... 111/105, 106; 172/13, 14, 15, 371, 378; 254/132, 30, 131; 294/50.6, 50.8, 50.9

(56) References Cited

U.S. PATENT DOCUMENTS

| | | | | |
|---|---|---|---|---|
| 779,984 A | * | 1/1905 | Allen | 254/132 |
| 3,976,282 A | * | 8/1976 | Baker | 254/132 |
| 4,673,165 A | * | 6/1987 | Nelson et al. | 254/132 |
| 4,856,759 A | * | 8/1989 | Ness | 254/132 |
| 5,857,529 A | * | 1/1999 | Nguyen | 172/378 |

* cited by examiner

Primary Examiner—Robert E Pezzuto
(74) Attorney, Agent, or Firm—Jack C. McGowan; McGowan & Jacobs

(57) ABSTRACT

An implement for removing honeysuckle bushes and the like wherein the implement is inserted below the soil surface and the root ball of the bush is leveraged up and out of the soil. The implement may be manually used to break the roots of the bush before ultimate removal.

8 Claims, 3 Drawing Sheets

HONEYSUCKLE BUSH REMOVER

BACKGROUND OF THE INVENTION

This invention relates to the removal of shrubs, specifically honeysuckles, including Amur honeysuckles. It will also work on other shrubs with a similar type of root system, which is a hard root ball with horizontally extending support roots that stay within two to 8 inches from ground level.

Amur honeysuckle is a fast growing and spreading alien species first imported into the U.S. in 1870. Its purpose was for use as a decorative shrub line.

Honeysuckles have now proliferated into 24 states and are considered an invasive species by many national, state and university horticulture and parks organizations, some of which have active honeysuckle removal programs. These plants are damaging the natural eco-system by preventing natural growth in and around wooded areas.

The instant invention was created from the inventor's desire to remove a honeysuckle infestation. Other weed and shrub pulling devices on the market are effective in removing small honeysuckles; however, it was found that they were inadequate for removing honeysuckles over an inch or two in diameter. One reason is that an inadequate surface is available to prevent the tool from sinking into the ground when significant pressure is applied to leverage the honeysuckle. Furthermore, said devices have no mearts to engage the bottom of a root bail. Also, such tools tend to slide away from the honeysuckle reducing their efficiency. Lastly, they are not adapted for use as a root breaker to facilitate removal of the shrub.

An example of the prior art is disclosed in U.S. Pat. No. 5,609,325 issued Mar. 11, 1998 to DeKrmond entitled "Weed Pulling Device.," Although this tool provides a means of leverage to extract the plant, it has features that make it unsuitable for the heavy duty use required to remove honeysuckles of any substantial size. For example, the flat forked blade on the tip of the tool tends to catch on the horizontal roots (which are very difficult to cut) instead of sliding between and underneath the roots. The blade is designed to cut and directly engage the roots beneath the plant, but honeysuckles generally have no roots directly underneath except for small fibrous roots which do not contribute to the stability of the shrub. The honeysuckle does not have a tap root, nor does it exhibit vertical roots of any significant size. Another undesirable feature is the curved leverage member which also aasily sinks into the soft ground where honeysuckles commonly grow.

Another prior art tool is described in U.S. Pat. No. 4,856,759 issued Aug. 15, 1989 to Ness entitled "Woody Plant Extractor." This tool works by pulling from above rather than pushing up on the bottom of the root ball, but it can only handle shrubs up to 2½ inches in diameter. This limits one's ability to remove an entire patch of honeysuckle growth since many honeysuckle are larger than that.

Therefore, there is a need for a tool which will give one person the ability to easily remove shrubs such as honeysuckles up to 10 inches or more in diameter at the base and to provide a tool which .Is optimized for this purpose.

OBJECTS OF THE INVENTION

It is an object of the present invention to provide a tool which gives an individual of ordinary physical strength the ability to easily uproot shrubs such as honeysuckles.

Another object of the present invention is to provide a single tool capable of uprooting both small and large honeysuckles up to ten inches or more in diameter at the base.

It is also an object of the present invention to provide a tool strong enough to withstand the substantial bending stresses caused when removing a honeysuckle bush utilizing principles of leverage.

A further object of the present invention is to provide a tool light enough to be carried in the field by one person.

Another object of the present invention is to provide a tool that is adapted to be extended for deeper penetration into the ground to break roots that extend horizontally from the base to facilitate the removal of larger shrubs.

It is also an object of the invention to provide a tool with a stable base that will not slide away from a honeysuckle when pressure is applied to remove the shrub.

A still further object of the invention is to provide a tool to remove honeysuckles that resists sinking into the ground and maintains its pivot point sufficiently above the ground to effect efficient honeysuckle removal.

Other objects within the scope of the invention will be readily apparent to those skilled in the art from the following disclosure.

DETAILED DESCRIPTION OF INVENTION

Figure 1:
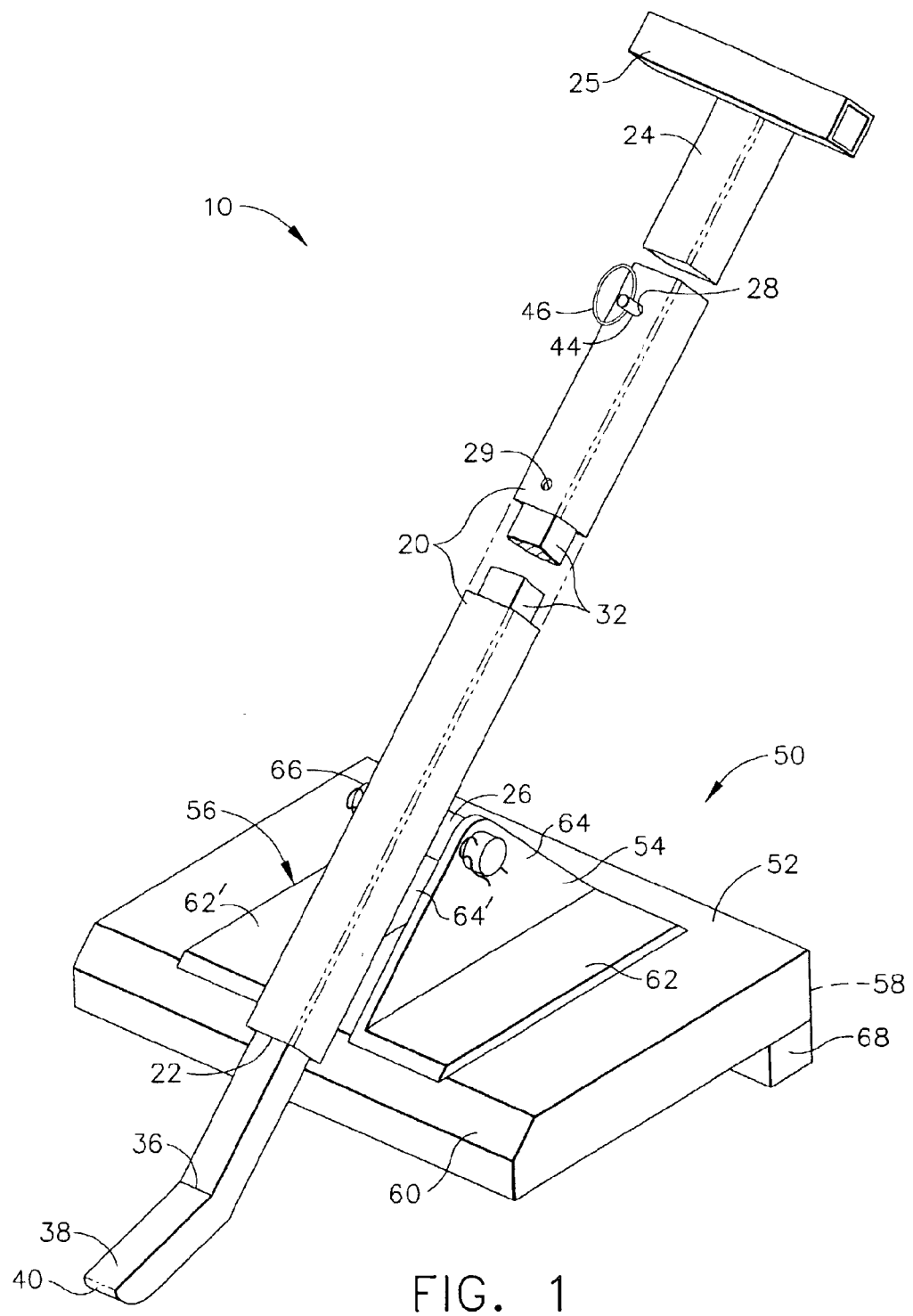
FIG. 1 shows a schematic three-dimensional view of an implement for removing a honeysuckle bush in accordance with the instant invention.
Figure 2:
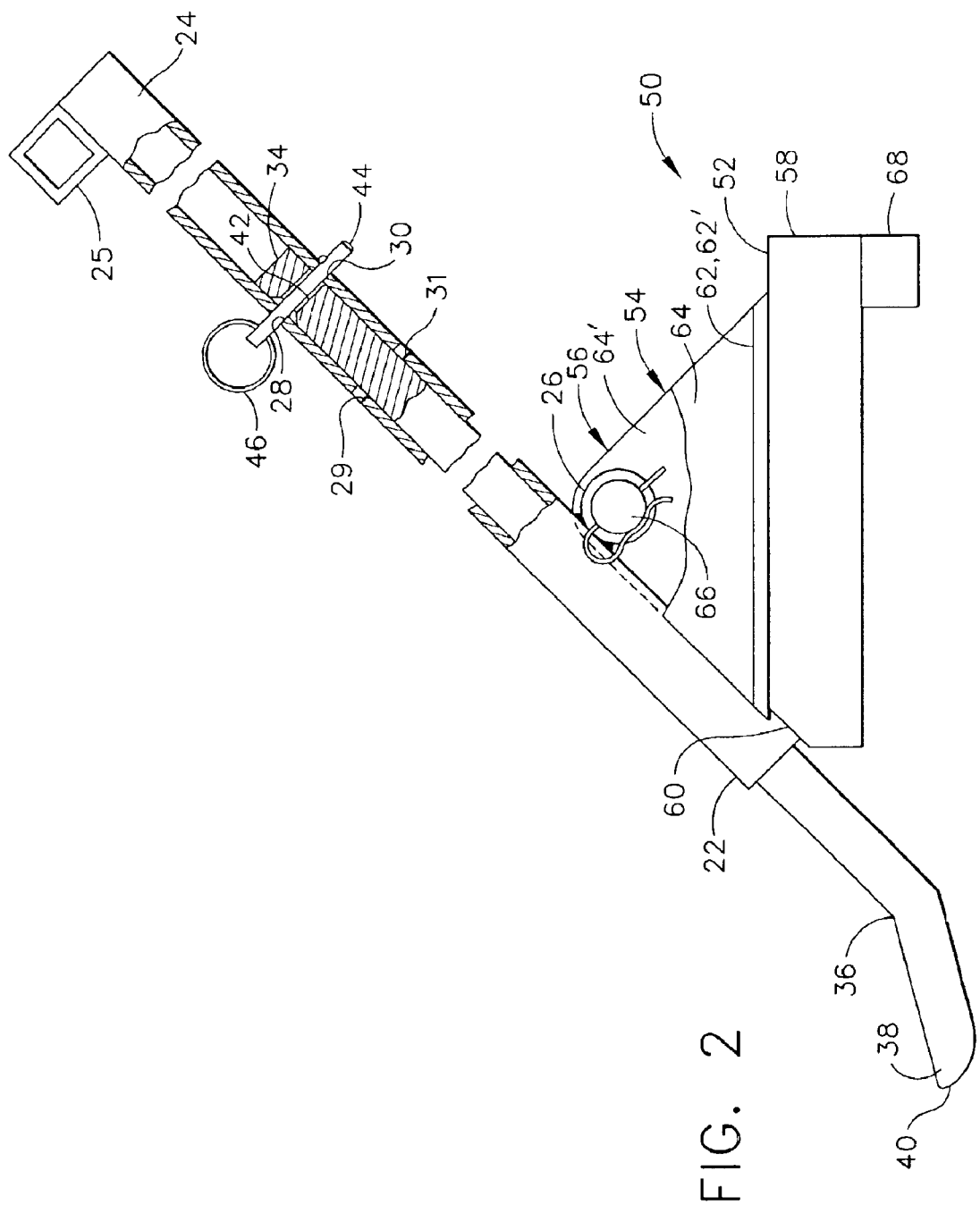
FIG. 2 is a side elevational view of the implement.

Referring to the drawings, a honeysuckle removing device 10 is shown in FIG. 1 which includes a hollow elongate member 20 having a first end 22 and an opposite second end 24. Said elongate member may include a handle 25 attached thereto. For illustration purposes a cross member is attached, as by welding, to elongate member 20 as shown. However, other well-known handle means could be substituted such as a pivoting member, the axis of which generally coincides with the axis of said elongate member. Openings 28 and 29 are aligned perpendicular to the axis of said elongate member and openings 30 and 31 are oppositely spaced from openings 28 and 29 and similarly aligned therewith. A sleeve 26 is welded to said elongate member in proximity to said first end. A solid bar 32 has a proximal end 34 and a distal end 38. Said bar contains a hole 42 therethrough perpendicular to its axis. Said bar 32 is bent at 36 and said distal end 38 terminates in a tip 40 which may be generally rounded on the underside thereof, as best seen in FIG. 2, and is flattened on its end. The tip is designed to penetrate the soil near a shrub and can be of various configurations known to those skilled in the art. Bend 36 and tip 40 provide a pocket which increases the surface area of the bar coming into contact with the root ball of a honeysuckle bush.

Proximal end 34 of bar 32 telescopically fits within said first end of elongate member 20 and is affixed relative thereto by a snap-lock pin 44 which extends through said holes in said elongate member 20 and said bar. It will be understood that the length of said bar extending from said elongate member 20 can be adjusted depending upon the holes used for said snap-lock pin. Said snap-lock pin 44 has a ring 46 on one end thereof to enable it to be removed and inserted in the holes of choice.

Elongate member 20 is pivotally connected between its two ends to a triangular platform assembly 50. Said assembly 50 has a base 52 and two supports, 54 and 56 respectively. Said base 52 has a vertical face 58 against which the user applies foot pressure to insert the implement. Said base 52 also has a second face 60 that serves as a bearing surface for said elongate member 20 such that as the implement penetrates the ground, said base 52 and said elongate member 20 cooperate to maintain the intended angle of insertion.

Each support 54 and 56 includes a base 62, 62' and an upright portion 64, 64', respectively. Supports 54 and 56 are preferably fabricated from angle iron and are spaced from each other on the surface of platform assembly base 52. A pin 66 runs between the upright portions 64, 64' and through sleeve 26. Said elongate member 20 is affixed to said pin 66 such that said elongate member can rotate to a certain extent about said pin. Extending from the bottom of said platform assembly base 52 is a cleat means 68. The bearing surface 60 acts as a stop means to position said elongate member 20 and said bar 32 at a pre-determined angle relative to said platform assembly base 52. In this position, the implement is adapted for easy insertion of the rounded, flattened tip 40 into the ground and under the root ball of a honeysuckle bush.

OPERATION OF INVENTION

Figure 3:
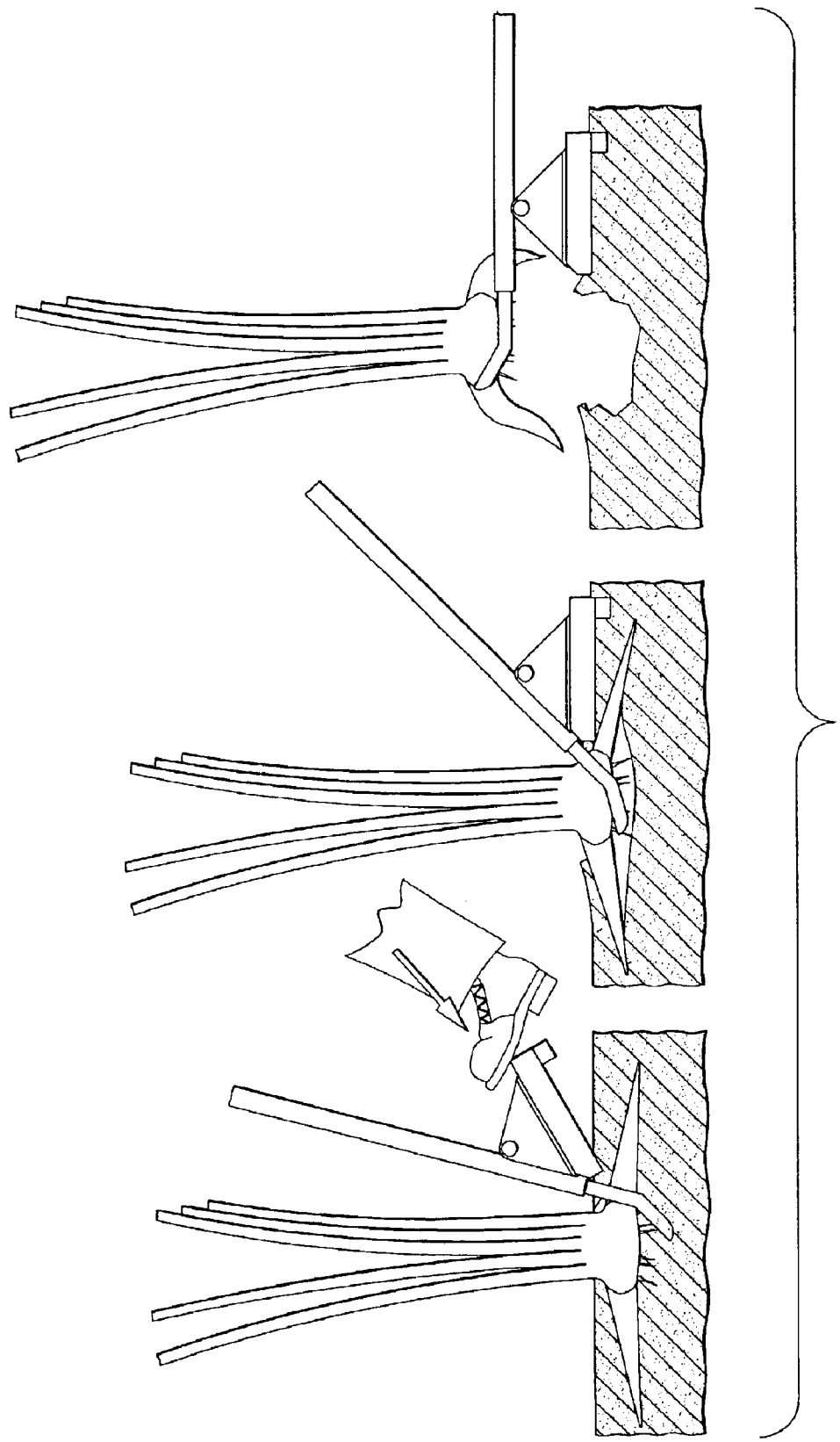
FIG. 3 is a series of three side elevational views illustrating the manner in which the implement is inserted and utilized to remove a honeysuckle shrub.

Referring to FIG. 3, the tool is placed in a near-vertical position adjacent to the base of a shrub. Foot pressure is applied to the base of the platform to push the tip of the tool under the root ball. Should a horizontal root or rock hamper or prevent penetration, the tool may be moved to another position about the base of the shrub to penetrate the soil. The tip is fully inserted until the platform contacts the ground surface. It is usually very easy to insert the tip due to the soft soil directly beneath the fibrous root ball and because there are no vertical roots to obstruct the tip. One should keep the tool as close as possible to the base of the shrub for best results. The rounded edge and the bend on the tip tends to direct the tool toward the shrub as it is inserted, which helps to keep the tool close to the base of the shrub.

The leverage bar is then lowered by a downward pressure by the user until the bottom of the platform is virtually in full contact with the ground. The tip is then in position to push upwards on the bottom of the root ball as the tool is used. Ideally, the leverage bar is approximately at a 45-degree angle to the ground surface.

A single downward pressure on the leverage bar pushes the root ball anywhere from 3 to 6 inches above ground level, depending upon how soft the soil is. Small shrubs pop out easily, but considerable pressure is required to remove larger shrubs. The cleat on the bottom of the platform and the bend in the tip resist the tendency for the tool to slide backwards when pressure is applied on the leverage bar. A slow, steady, downward pressure is found to be the best method to remove the shrub.

A typical honeysuckle patch may well contain honeysuckles that will not budge when all one's weight is applied to the leverage bar, especially if there are ones over 3 inches diameter at the base. There are two methods to extract such larger shrubs. The easiest way is to have a second person insert another tool on the opposite side of the first tool and then both tools are used to pry the shrub at the same time. This is very effective, but it may not be practical.

A second method of removing larger honeysuckles is to use the "Root Breaker" position for the tip. The root breaker position extends the tip of the tool 3 to 4 inches to facilitate hooking underneath the support roots. It should be kept in mind that the large support roots for this type of shrub fan out horizontally and rarely are found more than 6 inches below the surface of the soil. The tool is inserted vertically approximately 8 to 12 inches to the side of the shrub's base and pressure is then applied to the bar as previously described until a support root is engaged. By applying downward pressure, the tip will snap the support root. One then works in a circle around the shrub finding and breaking additional support roots. Care must be taken in applying pressure under these circumstances so that the tool does not bend. After several roots have been broken, one may return the tip to the original position and use the tool in the previously described conventional manner. The shrub will tend to fall over in the direction of any support root it has left. One may then utilize the tool to break the remaining support roots thus enabling the honeysuckle to be removed. Even larger suckles can be removed in about 10 minutes using this tool.

CONCLUSION

Thus, the inventor has disclosed a novel tool for removal of shrubs such as honeysuckles which have a number of features not found nor contemplated heretofore. The instant tool provides a large platform which tends to resist sinking into soft soils. There is a cleat on the bottom of the tool to prevent it from sliding as the tool is used to remove a honeysuckle or similar shrub. The tool is shaped at its end to cup the root ball of the shrub while the tool is of such strength and design as to prevent bending in use. The tip of the tool is rounded to facilitate its entrance into the ground, but not sharpened. Whereas prior art tools exhibit wide blades, such blades would make it more difficult to fit the present tool between the large roots next to the base of most honeysuckle shrubs. Hence the present invention utilizes a square bar to provide easier insertion of the tool through the web complex to a position beneath the root ball. This design enables the tool to be used closer to the shrub's base which increases the available leverage thus facilitating removal of the shrub.

As previously described herein the tool essentially pushes the root ball out of the soil rather than pulling it out. In operation the tool tends to break the roots rather than cut them. In those instances where roots are deeper or extend well beyond the base, the tool can be adjusted to break the roots. Furthermore, the solid bar is removable from the main tubular member to use for breaking soil loose from larger root balls. The design contemplated by the inventor is suitable for removing shrubs up to ten inches or more in diameter at the base, thus eliminating the need for different sized tools. Moreover, the design is simpler than that found in the prior art which will result in less cost to manufacture.

What is claimed is:

1. An implement for removing a honeysuckle bush or similar shrub from the soil comprising:
   a. an elongate hollow member having opposite ends;
   b. a solid bar having a proximal and a distal end, said proximal end telescopically fitted into and within a first end of said elongate hollow member;
   c. said solid bar having a portion near said distal end for contacting the root ball of a shrub;
   d. said solid bar having a means on its distal end to penetrate the soil;
   e. means for affixing said solid bar and said elongate hollow member relative to each other;
   f. a platform assembly having a top side and a bottom side;
   g. said platform assembly having a substantially flat bottom surface for contacting the surface of the soil near a honeysuckle bush;

h. said platform assembly being pivotally connected on its top side to said elongate hollow member along its axis in between its mid-point and said first end;
i. said pivotal connection comprising means for pivoting said elongate hollow member and said solid bar about an axis transverse to the longitudinal axis of said elongate hollow member;
j. whereby said solid bar may be inserted beneath the soil near a shrub until said platform assembly is in contact with the surface of the soil and said elongate hollow member is then pivoted so said portion contacts the root ball of the shrub to leverage and remove the shrub from the soil.

2. The honeysuckle bush removing implement of claim 1 wherein said means for affixing said solid bar and said elongate hollow member comprises holes through each and a pin removably placed through said holes.

3. The honeysuckle bush removing implement of claim 1 wherein said means for affixing said solid bar and said elongate hollow member comprises multiple means.

4. The honeysuckle bush removing implement of claim 1 further comprising a cleat means extending from the bottom of said platform assembly.

5. The honeysuckle bush removing implement of claim 1 wherein said platform assembly is generally triangular shaped and has stop means thereon to limit the extent to which said elongate hollow member can pivot about said platform assembly.

6. The honeysuckle bush removing implement of claim 1 wherein said elongate hollow member has a handle means attached thereto.

7. The honeysuckle bush removing implement of claim 1 wherein the means to penetrate the soil is a tip.

8. The honeysuckle bush removing implement of claim 7 wherein said tip is generally rounded on the underside thereof.

* * * * *